May 6, 1930.  O. A. STORAASLI  1,757,097
LINK HOOK
Filed Nov. 27, 1929
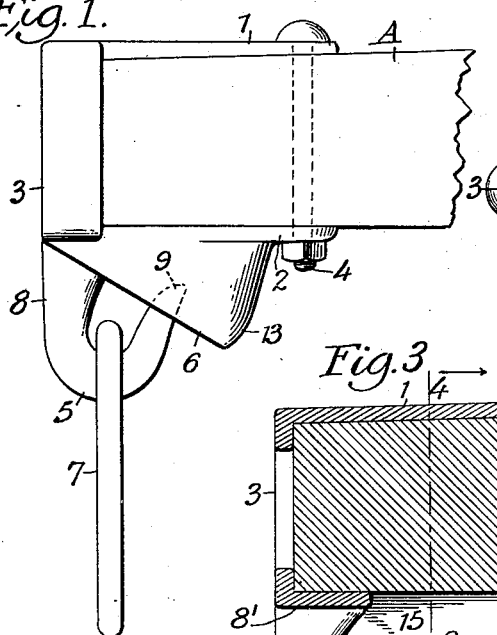
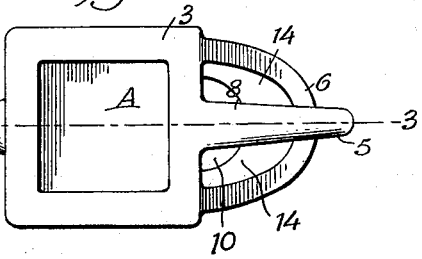
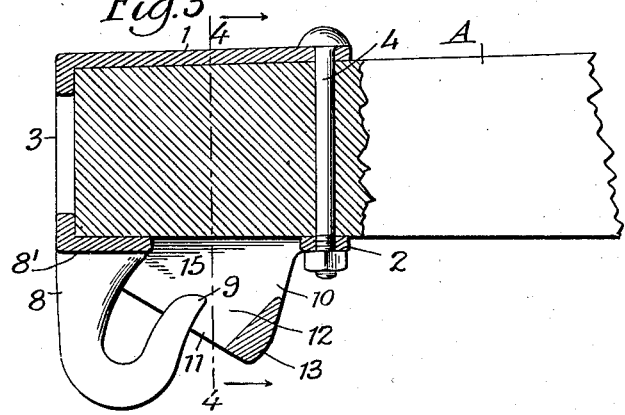
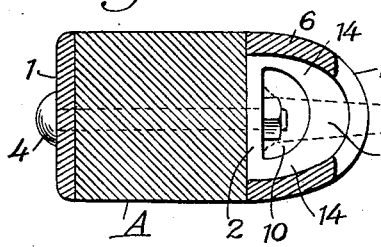
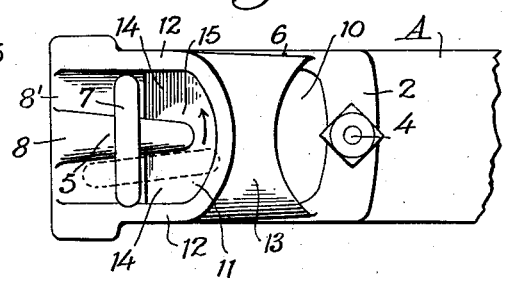
Inventor
Oscar A. Storaasli
By C. C. Hines.
Attorney Patented May 6, 1930

1,757,097

UNITED STATES PATENT OFFICE

OSCAR A. STORAASLI, OF TOPPENISH, WASHINGTON

LINK HOOK

Application filed November 27, 1929. Serial No. 410,166.

This invention relates to link hooks for use in connection with single-trees, draft-rigging, etc., of various kinds, and the main object of the invention is to provide a hook for engagement by a non-flexible link, ring or eye for holding the latter in such a manner that it cannot become accidentally disengaged therefrom.

A further object of the invention is to provide a link-holding hook for general purposes which requires the link to be applied to and removed from the hook in a prescribed manner, and in which the hook is protected against interference with or from other objects and from being clogged by mud or other obstructions.

The invention consists of the features of construction, combination and arrangement of parts, hereinafter fully described and claimed, reference being had to the accompanying drawing, in which:—

Figure 1 is a top plan view of the device as employed as a single-tree hook, a portion of a single-tree being shown.

Figure 2 is an end elevation thereof.

Figure 3 is a horizontal section on line 3—3 of Figure 2.

Figure 4 is a vertical transverse section on line 4—4 of Figure 3.

Figure 5 is a view looking toward the mouth of the guard, showing in broken and full lines, respectively, a position of the link in applying and removing it and its operative position when applied.

The device shown in the present instance, as designed for use upon a single-tree or other draft bar, beam or element A, is U-shaped to receive and embrace the end of the element A and comprises side clips 1 and 2 bearing against opposite sides of the element A and an end clip 3 joining said side clips and engaging the extremity of the element A, the device being secured in position by one or more bolts or other fastenings 4 passing through the clips 1 and 2.

The side clip 2 and adjacent side of clip 3 form a support for a hook 5 and a guard 6, which hook is adapted to be engaged by a rigid link 7 attached to a trace or other draft element (not shown), a link of oblong form being shown in the present instance. The parts 1, 2, 3, 5 and 6 may be formed as a single casting, if desired.

As shown, the shank 8 of the hook 5 projects outwardly from and at right angles to a cross-piece 8′ forming the outer end of clip 2 and a side of clip 3, while the bill or point 9 of the hook projects toward the clip 2 and forms an opening 10 in the clip 2 inwardly beyond the inner edge of the cross-piece 8′, between which portions of the clip 2 and hook 5 a throat or passage 11 is formed for the passage of the link 7 into and out of engagement with the opening of the hook.

The guard 6 comprises a pair of side plates 12, lying equidistantly on opposite sides of the hook, and a curved hood 13 connecting said plates at their inner ends and overhanging the bill of the hook, thus providing side passages 14 between the hook and plates 12 and a cross passage 15 connecting said side passages inwardly of the bill of the hook with the throat 11. The plates 12 are of triangular form, said plates being of minimum depth at their outer ends intersecting the cross-piece 8′ and of maximum depth at their inner ends where they intersect the hood 13, whereby the described relative arrangement of the parts of the hook and guard are obtained. A clearance opening 15 is provided at the inner end of the hook for the passage of mud or debris, such opening preventing clogging of the hood and rendering it self-cleaning when the parts in use are dragged through mud or other obstructions.

The distance between the plates 12, as well as the distance between the hook and portion of the guard overhanging the same, is less than the width of the link 7, and hence the link can only be engaged with or disengaged from the hook by a prescribed movement. To engage the link with the hook the link is turned to a position substantially parallel with the plane of the hook and inserted through one or the other of the passages 14 until its inner end enters the passage 15, whereupon, by turning the link at a diagonal angle to the plane of the hook, as shown in broken lines in Fig. 5, the link may be moved through the passage 15 and throat 11 into the opening of the hook and then disposed in its normal working position shown in full lines in Fig. 5. When thus engaged it is practically impossible for the link to become accidentally disengaged and the link can only be disengaged by reversing its applying movement above described. While, therefore, it is easy to manually engage the link with or release it from the hook, accidental disengagement of the link cannot occur notwithstanding any slackness which may be present between the link and the hook.

By the construction described the device may not only be fastened firmly to a singletree or other draft element, but, as the bill of the hook is wholly enclosed by the guard, the hook is protected against weeds or trash being caught and choking the guard and interfering with the free relative movements of the connected parts, the connection is made safer, clogging by mud or other foreign substances is prevented, and ease and convenience of operation is ensured. While the device is described in connection with a whiffletree, it may, of course, be used in logging, mining, and in various kinds of rigging in shipping, hauling and construction work, and for many other purposes.

Having thus fully described my invention, I claim:—

1. A link hook embodying a hook member and a guard member, the latter comprising side plates forming side passages on opposite sides of the hook member and a curved hood connecting said side plates at their inner ends and forming a cross passage connecting said side passages, said passages being of less width than the width of the link to be connected to the hook, the hood being open at its side facing the hook and arranged to enclose and overhang the bill of the hook and the side plates being of triangular form and having their outer edges beveled to gradually increase their depth between the base of the hook and the hood.

2. A link hook embodying a hook member and a guard member, the latter comprising side plates forming side passages on opposite sides of the hook member and a curved hood connecting said side plates at their inner ends and forming a cross passage connecting said side passages, said passages being of less width than the width of the link to be connected to the hook, the hood being open at its side facing the hook and arranged to enclose and overhang the bill of the hook and having at its opposite side a clearance opening.

3. A link hook of U-form and comprising two parallel side clips and a cross-clip connecting the same at one end, one of said side clips carrying a hook member and a guard member, the latter comprising side plates forming side passages on opposite sides of the hook member and a curved hood connecting said side plates at their inner ends and forming a cross passage connecting said side passages, said passages being of less width than the width of the link to be connected to the hook, the hood being open at its side facing the hook and arranged to enclose and overhang the bill of the hook and the side plates being of triangular form and having their outer edges beveled to gradually increase their depth between the base of the hook and the hood.

In testimony whereof I affix my signature.

OSCAR A. STORAASLI.